Figure 1:
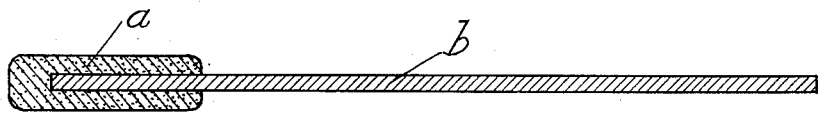

Dec. 15, 1931.  W. O. SNELLING  1,836,196

METHOD OF TREATING MOLTEN MATERIALS

Filed Oct. 24, 1928

Walter O. Snelling,
Inventor.

Patented Dec. 15, 1931

1,836,196

UNITED STATES PATENT OFFICE

WALTER O. SNELLING, OF ALLENTOWN, PENNSYLVANIA

METHOD OF TREATING MOLTEN MATERIALS

Application filed October 24, 1928. Serial No. 314,830.

My invention relates to improvements in methods of treating molten materials, and more particularly relates to improved means for stirring molten glass, molten copper and like materials. It is the principal object of my invention to provide means for agitating or stirring molten materials, and for bringing about desired reducing or other chemical effects within such molten materials, in a more efficient manner than by methods at present known. Another object of my invention is the providing of a substitute for the boughs of green wood used in the poling of copper, enabling the stirring of the molten copper to be performed in a more economical and in a much more uniform manner than when boughs of green wood are used as in the ordinary poling operation. This specification is a substitute for my forfeited application S. N. 144,720, filed October 28, 1926.

In the poling of molten copper, boughs and branches of green wood of suitable diameter and length are used to stir the molten metal. As the temperature of the metal is far above the carbonizing temperature of wood, the moisture contained in the green wood together with the volatile products of thermolysis of the wood are liberated in large volume, and efficiently stir the molten metal in passing upward from the pole. Although the use of boughs and branches of green wood for the purpose of poling copper has been known and practiced for many years, the operation is open to strong objections. It will of course be evident that no two pieces of wood will be of just the same moisture content, and that accordingly the method is in itself crude when compared with the degree of control usually present in other metallurgical operations. The selecting of a sufficient number of poles of wood of suitable character to take care of the poling operation in a large copper refinery is difficult and expensive, and changes in the moisture content of the wood according to the season increases the lack of uniformity which is characteristic of this entire very crude operation.

The explosive violence with which molten metal transforms water into steam has prevented up to this time successful efforts being made to introduce water in any other form than as the moisture contained in the green wood, and recognition of the fact that the products of carbonization of the wood have a desirable reducing effect upon the copper has also served to prevent any substitute for the very crude operation of the poling being introduced in copper smelting practice.

I have discovered that by introducing oil, or water, or a mixture of oil and water, into a porous mass of clay or other like porous material, and mounting this impregnated clay mass upon a rod of any suitable form and length, I can accomplish all of the effects produced by poling with sticks of green wood, and can in addition render the operation much more uniform and controllable than when green wood is used as the source of the gases or vapors used in bringing about the stirring of the molten metal.

Figure 2:
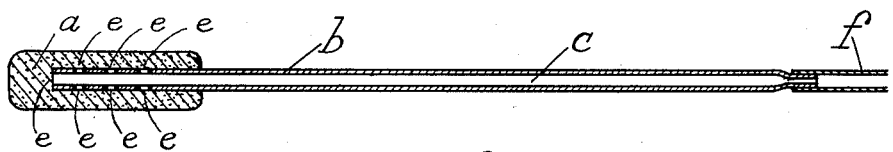
Figure 3:
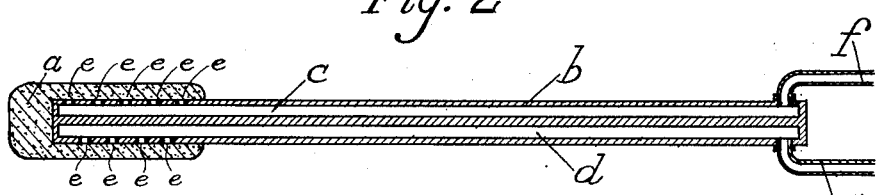
Figure 4:
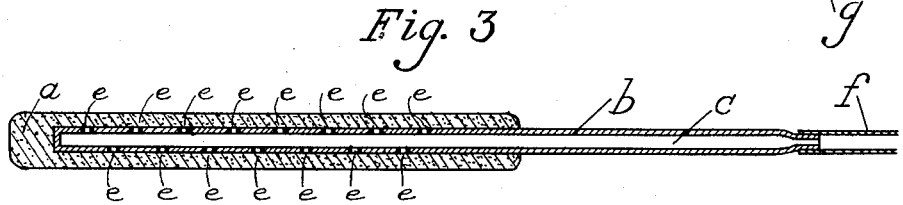
Figure 5:
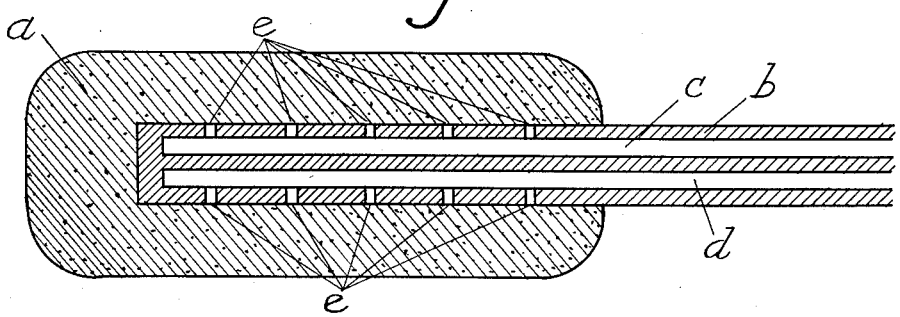

In the drawings forming part of this specification Figure 1 is a diagrammatic view of a section through one form of pole such as I may use in the practice of my invention. Figures 2, 3 and 4 are sections through somewhat modified types of poles. Figure 5 is a sectional view through the porous head of one of my poles, for the purpose of better showing the details of its construction.

In Figure 1 $a$ is the head of my improved pole, this head being conveniently made of porous clay, porous alundum, or other like porous material. $b$ is a rod or pole of metal or any other suitable material that will temporarily resist the action of the molten metal or other molten material that is to be stirred. In Figure 2 $a$ is the porous head, $b$ is the supporting rod, $c$ is a conduit within the rod $b$, and $e\ e\ e$ are small openings communicating from the conduit $c$ to the porous material constituting the head *a*. In Figure 3 *a* is the porous head, *b* is the supporting rod, *c* and *d* are conduits within the rod *b*, and *e e e* are openings connecting the interior of the conduits *c* and *d* with the porous mass constituting the head *a*. In Figure 4 *a* is a porous head, much longer than the head in Figure 1, but otherwise similar in nature, *b* is a supporting rod, *c* is a conduit within such rod, and *e e e* are openings connecting the interior of the conduit with the porous mass constituting the head *a*.

In stirring a material such as molten glass, I may use the form of my device shown in Figure 1, the pole being first placed in water until the porous head has absorbed a suitable amount of the liquid, and then being dried until no drops of free water are present on its surface. Upon plunging such a pole into molten glass steam is evolved from the water contained in the porous clay, and is given off gradually as the head heats up, thus producing the desired stirring effect. The steam is not driven off with explosive violence, as would be the case if water not absorbed in a porous material were introduced into the molten glass, and the rate at which the steam is evolved may be controlled by modifying the porosity of the porous material forming the porous head, and also by modifying the heat insulating characteristics of the material. By using as the porous material a substance of coarse texture and high heat transmission very rapid and vigorous stirring of the glass can be brought about, while by using as the porous material a substance of very fine texture and low heat transmission very slow, long continued and uniform stirring of the glass can be brought about. By using intermediate degrees of porosity and heat transmissibility intermediate effects can be produced.

The purpose of immersing the porous body containing an absorbed volatilizable liquid in the molten material is to secure the evolution of gases and vapors beneath the surface of the molten material, in an orderly manner dependent upon the conductivity for heat of the porous body and also dependent upon its porosity and upon the temperature of volatilization of the liquid employed. It is intended that the term "immersing" should be considered in a broad sense, as covering the contacting of the porous body containing absorbed volatilizable liquid with the molten material to be stirred at some point beneath the surface of the molten liquid, by whatever means such immersing of the porous member containing an absorbed liquid may be brought about. Instead of plunging or immersing a porous rod or bar within a body or pool of molten material, the rod being movable and the liquid stationary, the same effect will be produced if the porous rod with its absorbed liquid is stationary and the body of molten material is moved, as by pouring molten material from one vessel to another in which a porous rod is suspended, or a portion of the walls of which receptacle comprises a porous member containing an absorbed liquid as described, such porous member preferably forming a part of the side walls or bottom of the vessel, or being attached thereto by any convenient means.

For the poling of copper I may use the form of pole illustrated in Figure 2, water, or oil, or a mixture or emulsion of water and oil being forced into conduit *c* through tube *f*, from any suitable source of material such as a tank, and by any suitable means such as gravity feed or a pressure pump giving any desired pressure.

Instead of using an emulsion of oil and water, I may employ the apparatus shown in Figure 3, the pole being provided with individual conduits *c* and *d* for the two fluids, and the two fluids being supplied by separate pipes *f* and *g*.

It is sometimes desirable to use a pole having so long a head that no part of the rod *b* needs to come in contact with the molten metal to be stirred, and the form of pole shown in Figure 4 is adapted to this use. Although in the drawing I have shown this type of pole having a long head with but a single conduit for fluid, it will of course be evident that a similar elongated head may be used with any form of my invention, as for example with a solid rod not containing a conduit for fluid, or with a rod having a plurality of conduits for different fluids.

Where stirring accompanied by reducing effects is desired, I prefer to use oil instead of water as the material for impregnating my porous head *a*. I may use fuel oil, gas oil or any other suitable oil or liquid fatty material, according to the effect desired. The oil is thermolyed or destructively decomposed by the temperature of the molten metal, and produces gases which in passing through the molten metal have desired chemical effects in addition to their stirring effects, and which thus give results somewhat similar to the effects produced by the products driven off from wood in poling, but which can be better controlled than the products driven off from wood, both as to chemical composition and rate of evolution.

It will of course be evident that in addition to liquids such as water and oil, I may introduce oxidizing gases such as air, or reducing gases such as carbon monoxide, through a conduit in my pole, for the purpose of supplementing in any desired way and to any desired extent the stirring and chemical effects produced in my poling operation.

Instead of forming the head of my improved stirring device of a refractory porous body such as clay, biscuitware, alundum, diatomite or the like, I may employ a carbonaceous porous material such as briquets of charcoal, bituminous coal or equivalent material. Although these materials in their normal condition contain too small an amount of moisture and volatile constitutents to serve as efficient stirring agents in the poling of copper, for example, I find that porous masses of pulverized charcoal or bituminous coal or the like formed into briquets and saturated with water, oil or preferably with an emulsion of oil and water, form very desirable stirring agents in the refining of copper, and give results much superior to those obtained from boughs of green wood as now commonly used. In forming my briquets I prefer to use molasses as a cementing agent, the briquets being later baked to carbonize the molasses, but instead of molasses I may use many other binding agents, of which coal tar and concentrated sulfite waste liquor may serve as examples. The briquets should be sufficiently firm to permit of being mounted rigidly on the pole or rod used to introduce them into the molten metal, and should preferably be sufficiently porous to permit of the absorption of from one-third to one-half of their initial weight of the volatile liquid intended to be used as the stirring agent.

Although I have described the head of my improved pole as being made of a porous material of uniform structure, it will of course be evident that instead of forming this head of a single porous material of homogeneous structure I may employ a plurality of porous materials, such as an inner core of a highly porous material of high heat conductivity, surrounded by an outer layer or zone of a porous material of very fine structure and of very low heat conductivity, and for some purposes the use of such a composite structure for the head of my improved pole has advantages. It will also be evident that by means of rings, grooves or indentations in my pole, improved adherence of the head may be secured, but I am not specifically claiming such modifications of structure, as many changes in form may be made in the construction and operation of my improved stirring means, without departing from the essential principles of my invention as herein described. Accordingly no limitations should be imposed upon my invention except such as are indicated in the appended claims.

I claim:

1. The process of treating molten materials which comprises contacting a porous receptacle containing an absorbed volatilizable liquid with the molten material to be treated while maintaining the molten material at a temperature above the volatilizing temperature of the absorbed liquid.

2. The process of treating molten materials which comprises introducing a porous carbonaceous briquet containing an absorbed volatilizable liquid within a body of the molten material to be treated while maintaining the molten material at a temperature in excess of the volatilizing temperature of the absorbed liquid.

3. The process of treating molten materials which comprises contacting a porous mass of consolidated carbonaceous material containing an absorbed volatilizable liquid with a body of the molten material to be treated while maintaining the molten material at a temperature in excess of the volatilizing temperature of the absorbed liquid.

4. The process of stirring molten materials which comprises introducing a porous briquet of charcoal containing absorbed water within a body of such molten material.

5. The process of treating molten materials which comprises introducing beneath the surface of such material a porous briquet of charcoal containing an absorbed emulsion of water and oil.

6. The process of treating molten materials which comprises absorbing a liquid in a porous receptacle and bringing such porous receptacle with its contained liquid into contact with the molten material under conditions of temperature which will cause volatilization of the absorbed liquid and stirring of the molten material.

7. The process of treating molten materials which comprises bringing a porous solid containing an absorbed volatilizable liquid into contact with the molten material at a point under the surface of such molten material while maintaining the molten material at a temperature in excess of the volatilizing temperature of the absorbed liquid.

8. The process of treating molten copper which comprises absorbing a liquid volatilizable at a temperature lower than the melting point of copper in a porous receptacle and immersing such porous receptacle with its absorbed liquid in the molten copper.

9. The process of treating molten copper which comprises absorbing a liquid volatilizable at a temperature lower than the melting point of copper in a porous receptacle and contacting such porous receptacle with its absorbed liquid with the molten copper.

10. The process of treating molten copper which comprises absorbing a liquid volatilizable at a temperature lower than the melting point of copper in a porous receptacle and contacting such porous receptacle with its absorbed liquid with the molten copper at a point beneath its surface.

11. The process of treating molten materials which comprises separating a body of molten material from a body of a vaporizable liquid by a septum porous to the vaporizable liquid while maintaining such porous septum at a temperature higher than the boiling point of the vaporizable liquid.

12. The process of treating molten materials which comprises separating a body of molten material from a body of a vaporizable liquid by a septum porous to the vaporizable liquid, maintaining such porous septum at a temperature higher than the boiling point of the vaporizable liquid, and applying pressure to the vaporizable liquid to cause a transfer of fluid through the porous septum.

In testimony whereof, I have hereunto subscribed my name this 22nd day of October, 1928.

WALTER O. SNELLING.